United States Patent
Schmid et al.

(10) Patent No.: US 7,312,263 B2
(45) Date of Patent: *Dec. 25, 2007

(54) THERMOPLASTIC POLYAMIDE MOULDING COMPOSITIONS

(75) Inventors: Eduard Schmid, Bonaduz (CH); Ornulf Rexin, Domat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/026,243

(22) Filed: Dec. 29, 2004

(65) Prior Publication Data

US 2005/0148729 A1 Jul. 7, 2005

(30) Foreign Application Priority Data

Dec. 30, 2003 (DE) .................. 103 61 712

(51) Int. Cl.
 *C08K 5/34* (2006.01)
(52) U.S. Cl. .................. 524/98; 524/99; 524/104; 524/155; 524/156; 524/158; 524/169; 525/66; 525/183; 525/420; 525/425; 525/430; 525/431; 525/433
(58) Field of Classification Search .............. 525/66, 525/183, 420, 425, 430, 431, 433; 524/98, 524/99, 104, 155, 156, 158, 169
See application file for complete search history.

(56) References Cited

U.S. PATENT DOCUMENTS

| 4,711,925 A | * | 12/1987 | Mumcu et al. | ............. 524/417 |
| 5,756,647 A | | 5/1998 | Schmid et al. | .............. 528/323 |
| 6,506,830 B1 | | 1/2003 | Bussi et al. | ................. 524/495 |
| 6,753,363 B1 | | 6/2004 | Harashina | .................... 524/99 |

FOREIGN PATENT DOCUMENTS

| EP | 0469542 A2 | 2/1992 |
| EP | 0469542 A3 | 2/1992 |
| EP | 0748 847 | 12/1996 |
| WO | WO 97/10303 | 3/1997 |
| WO | WO 01/05888 | 1/2001 |
| WO | 2005/000953 | 1/2005 |

\* cited by examiner

*Primary Examiner*—Ana Woodward
(74) *Attorney, Agent, or Firm*—J.C. Patents (57) ABSTRACT

The present invention relates to thermoplastic polyamide moulding compositions which contain at least one copolyamide with at least 20% by weight polyamide 12 components and at least one aprotic compound selected from the group of N-alkylated, cyclic carboxylic acid amides with 5 to 7 ring elements and/or of urea derivatives, the alkyl rests of which are linear at the nitrogen or which form a linking of the two N-atoms, and a process for production of the moulding compositions. The thermoplastic polyamide moulding compositions are distinguished by the fact that no solid deposits are formed during thermoplastic conversion.

18 Claims, 6 Drawing Sheets

THERMOPLASTIC POLYAMIDE MOULDING COMPOSITIONS

CROSS-REFERENCE TO RELATED APPLICATION

This application claims the benefit of priority German Patent Application No. 103 61 712.4 filed on Dec. 30, 2003, which is incorporated herein by reference in its entirety for all purposes.

BACKGROUND OF THE INVENTION

1. Field of the Invention

The present invention relates to thermoplastic polyamide moulding compositions and a process for production of the moulding compositions. The present invention particularly relates to thermoplastic polyamide moulding compositions based on polyamide 12, which are made for further processing by injection moulding or extrusion and which do not result in solid deposits during thermoplastic conversion. The present invention more particularly preferred relates to thermoplastic polyamide 12 moulding compositions based on hydrolytically produced polyamide 12, which do not result in the usual solid deposits during processing in injection moulding or extrusion.

2. Description of Related Art

Polyamide 12 (PA 12) is the type of polyamide which is distinguished by its interesting property profile. Polyamide 12 can be modified in several ways, and the resulting moulding compositions are outstanding thermoplastic in injection moulding and convertible into items of valuable practical use in extrusion processes. Polyamide 12 corresponds to the type of polyamide the properties of which in practical use are the least influenced by changes in temperature and humidity.

One problem is that during the common hydrolytic polymerization process/autoclave treatment the monomer turnover is only 99.5% and the remaining lactam residue is hardly soluble in the polymer, so that, particularly in processing from melts, but also in the later use the lactam 12 (LC 12) is sweat out and sublimed, especially on cooled surfaces, e.g. the surfaces of moulds or rolls and prefabricated parts where it comes to the formation of coatings. Particularly due to the high melting point of lactam 12 those sublimates often form irritating coatings which, particularly when further additives migrate to the surface, give cause for processing troubles with surface damaging and production interruption and so-called "black spots" can also be formed. Well-known measures taken for reduction and elimination of the rest content of lactam 12 are, e.g. the melt- and solid phase postcondensation including vacuum, liquid extraction processes or reprecipitation from alcoholic solution. These processes where the lactam evaporates under thermal influence may as well be disrupted by the lactam sublimate. Furthermore the lactam smoke is highly inflammable and the processes require certain precautionary measures. Furthermore the additional thermal stress can damage the polymer. In thermoplastic processing of polyamide 12 (PA 12) moulding compositions by injection moulding and by extrusion, the formation of solid deposits, particularly those consisting of lactam 12 (LC 12), has a detrimental effect.

U.S. Pat. No. 6,506,830 B1 describes antistatic polyamide moulding compositions with common plasticizers according to the state of the art. The plasticizer concentrations correspond to the usually high plasticizer concentrations (see claim 9; up to 30% by weight). Although U.S. Pat. No. 6,506,830 B1 claim 9 mentions a plasticizer amount of up to 30% by weight and therefore theoretically all concentrations are contained, it is well-known from the literature that small plasticizer additions are regarded as rather giving contrary results due to the "anti-plasticizer-effect" when considering an improvement of material properties. However, in the same context as the plasticizers lactames are mentioned which are the main cause for the formation of deposits.

EP 0 748 847 A2 describes common plasticizer containing polyamide moulding compositions recognisable by the high plasticizer concentrations (preferably 8 to 20% by weight). Furthermore, the advantageous use of plasticizer mixtures is described. The quoted plasticizers also contain sulfonamides and hydroxybenzoates. However, EP 0 748 847 A2 confines itself to the flexibility and cold impact strength of polyamides. Problems of solid deposits are not mentioned. In contrast to this the evaporation of the plasticizer is quoted as a disadvantage (see p. 2, 1. 58 to p. 3, 1. 3). EP 0 748 847 A2 mentions the surface of the mould, but only in the context of a "nontacky surface" which is in no conjunction with the described problems of solid deposits. Apart from that for plasticizers closest attention is paid to vitrification temperature. However, properties at room temperature or higher temperature which are required for the solubility of the polyamide specific solid deposits are not dealt with.

WO 97/10303 uses plasticizers at concentrations of up to 5% by weight for the improvement of welding properties or the increase of joint line strength of the polyamide moulding compositions. Sulfonamides are used as well. But in the same context as the use of plasticizers lactames are mentioned (see p. 4, 1. 35-36). But just the lactames are the cause of the solid deposits.

WO 01/05888 describes moulding compositions which contain, beside polyacetal, flame proving agents and N-containing compounds that can be low molecular. Sulfonamides and urea derivatives belong to these compounds too. The N-containing compounds strengthen the flame protection and increase the stability of the moulding compositions described. In their function as stabilizers concentrations of up to 2.5% are used.

In accordance with WO 01/05888 the moulding compositions must always contain polyacetal and this reference gives no hint to the described problems of solid deposits. This is plausible, because polyamides can be contained in polyacetal, but never play a dominant role there.

EP 0 388 583 A1 is aimed at the fact that the deteriorated cold impact strength of polyamide moulding compositions due to softening can be balanced by certain polyamides. Common plasticizer-containing polyamide moulding compositions are described here with up to 25% by weight plasticizers.

Thus simple, cost saving measures are wanted to avoid the formation of solid deposits in the thermoplastic processing of PA moulding compositions which are based on polyamide 12 or also a copolymer or polyamide respectively, which contains polyamide 12 components as well.

BRIEF SUMMARY OF THE INVENTION

Thus it is an object of the present invention is to provide thermoplastic polyamide moulding compositions, on which no solid deposits are formed during thermoplastic conversion.

DETAILED DESCRIPTION OF THE INVENTION

The present invention relates to thermoplastic polyamide moulding compositions containing at least 20% by weight polyamide 12, related to the polyamide matrix component, and/or one copolymer with at least 20% by weight polyamide 12 components, related to the polyamide matrix component and at least one aprotic compound in amounts of 0.05 to 15.0% by weight related to the total mass of the polyamide matrix component, selected from the group of N-alkylated, cyclic carboxylic acid amides with 5 to 7 ring elements where the carboxylic acid amide corresponds to formula I, where x is 1 to 3 and R1 an octyl residue

I the octyl residue of which is linear or branched at the nitrogen and which, if need be, may contain heteroatoms and heterogroups or which form a linking of the two N-atoms, and/or the group of urea derivatives.

By use of this specific aprotic compound according to the present invention the sublimation of the lactam residue remaining in the polyamide 12 is admittedly not prevented, but the additional components of the formulation are capable of liquefying the lactam.

The thermoplastic polyamide moulding compositions are particularly thermoplastic polyamide 12 moulding compositions based on hydrolytically prepared polyamide 12 or based on polyamide 12-blockcopolymers which contain polyester-, polyether-, polysiloxane-, polycarbonate-, poly- acrylate-, polymethacrylate- or polyolefin segments as further components beside a proportion of at least 20% polyamide components, particularly polyamide 12 components.

Parts of the aprotic compound, but also lactam migrating to the surface during processing, experience diffusion back into the polyamide mould in the temperature range from e.g. 50° C. to 100° C. which are common conditions of practical use, which is considered unwanted behaviour. This unexpected result may be explained in a way that the aprotic compounds, particularly N-octylpyrrolidine, as the otherwise usual polyamide 12 plasticizer, N,N-dibutylbenzene sulfonamide or N,N-butyltoluene sulfonamide dissolve in the polyamide 12 matrix and, since N-octylpyrrolidine is also capable of dissolving lactame 12, enable its diffusion back into the matrix. The aprotic compound is taking effect in such a way that the sublimation of lactam 12 is admittedly not prevented, however, instead of solid deposits, fine, colorless and low viscous droplets are formed which spontaneously flow away, which can easily be wiped away, or, when remaining at the surface, diffuse back into the mould.

Thus the problem of solid deposits on polyamide 12 moulding compositions and copolymers which contain at least 20% by weight polyamide components with regard to the polyamide matrix component, can be solved to a large extent by purely amending a formulation for technical use. Therefore no additional processing steps and hence no additional thermal stress of the moulding compositions are necessary. Furthermore can the described novel aprotic compound as an additive for polyamide 12 containing (co)polyamides take on valuable additional tasks in polyamide 12. It increases impact strength and by addition in sufficient amounts it takes effect as a plasticizer for the polyamide, where it can also be used in combination with the usual benzene- or toluenesulfonic acid plasticizers for polyamide, such as N,N-dibutylbenzene sulfonamide (BBSA) and/or N,N-dibtytoluene sulfonamide.

Mixtures of two or more aprotic compounds or mixtures of at least one aprotic compound with a used plasticizer show, as compared to the single components, lower glass temperatures and thereby provide an improved low temperature impact strength for the processed polyamide moulding compositions.

The aprotic compound prevents especially at given amounts of 0.05 to 15.0% by weight in the polyamide matrix component efficiently from the formation of solid deposits, which is mainly caused by lactam 12. Preferred are added amounts of 0.1 to 3.0% by weight, more preferred are given amounts of 0.15 to 1.0% by weight.

The aprotic compound from the group of N-alkylated, cyclic carboxylic acid amides with 5-7 chain links preferably corresponds to a carboxylic acid amide of formula I:

I where x is 1 to 3 and R1 an octyl residue. Suitable compounds according to the present invention are N-octylpyrrolidone and N-octylcaprolactam.

N-octylpyrrolidone, in accordance with the present invention, is especially suitable. Lactam 12 and N-octylpyrrolidone have both a molecular mass of 197 g/mol and both are cyclic amides. Furthermore, N-octylpyrrolidone and lactam 12 evaporate in about the same range of temperature. While N-octylpyrrolidone evaporates at high temperature, the diffusion back into the polyamide matrix occurs at temperatures from 100 to 150° C. A major difference of these compounds is the melting point. Lactam 12 has a melting point of 150° C. and is therefore a solid at room temperature, while N-octylpyrrolidone is a liquid at room temperature and has a melting point of −26° C. An essential property of N-octylpyrrolidone with regard to the present invention is its capability to dissolve or to liquefy lactam 12. N-octylcaprolactam shows a similar behaviour to N-octylpyrrolidone, with a slightly lower solubility for the lactam.

To ensure that during processing droplets and no solid deposits are formed, not only a sufficient solubility of lactam in the aprotic compound is required, but also important is a volatileness of the aprotic compound adapted to the lactam, a sufficient solubility in the PA12 matrix and a convenient migration behaviour. A slightly higher or equivalent volatileness of the aprotic compound with regard to the lactam is advantageous.

The volatileness should in no case be too high, so that the advantages with regard to the problem of solid deposits are not more than compensated by the disadvantages of a too strong emission formation.

Even at higher concentrations the use of the aprotic solvents, in accordance with the invention, does not lead to decomposition of the polyamide moulding compositions so that the mechanic properties remain complete.

Further preferably used aprotic compounds are urea derivatives of formula II

II where R2 and R' can be different or identical, linear or branched and consisting of 1 to 8 C-atoms or each 2 R' can be an ethylene- or propylene bridge which connects the two N-atoms. Especially preferred is the compound in which R2 and R' are butyl residues. Further particularly suitable are the cyclic N,N-dimethyl-ethylene- and -propylene-urea as well as tetrabutyl urea and mixtures of such urea derivatives. In a particularly preferred embodiment the urea derivatives are used as mixtures with the cyclic N-alkylcarbonamides. When the moulding compositions contain an aprotic compound according to formula I and/or formula II, during thermoplastic processing at cold parts of tool or moulding surfaces at most low viscous, colorless droplets or liquid films are formed which flow or drop away or which can be easily wiped off, but no sticking coverings.

In a preferred embodiment the copolymer is essentially polyamide 12, particularly polyamide 12-blockcopolymer which is most preferably made by hydrolysic polymerization or polycondensation processes. Alternatively, the copolymer or the (co)polyamide respectively can be a polyamide mixture which, for example, is a polyamide alloy or a multiphase blend that, if necessary, also contains compatibilizers and/or impact strength modifiers. For example, it therefore may be a two-phases polyamide mixture which consists of polyamide 12, a semiaromatic polyamide and, if need be, a compatabilizers.

In an alternative embodiment the mould is a polyamide mixture of at least 20% by weight polyamide 12 and a semicrystalline (co)polyamide and/or amorphous copolyamide. Particularly preferred as (co)polyamide is a mixture of polyamide 12 and an amorphous copolyamide.

As additional polyamides (PA) for the polyamide mixtures in accordance with the invention are advantageously polyamides based on $C_6$-$C_{12}$-lactams or ω-amino carboxylic acids with 4 to 18 carbon atoms, preferred 6 to 12 carbon atoms, or polycondensates obtained from the polycondensation of at least one diamine from the group of aliphatic diamines with 4 to 18 C-atoms, cycloaliphatic diamines with 7 to 22 C-atoms in combination with at least one dicarboxylic acid from the group of aliphatic dicarboxylic acids with 4 to 44 C-atoms, cycloaliphatic dicarboxylic acids with 8 to 24 C-atoms and aromatic dicarboxylic acids with 8 to 20 C-atoms. The ω-amino carboxylic acids or the lactams are selected from the group of ε-amino capronic acid, 11-aminoundecane acid, 12-aminododecane acid, ε-caprolactam, enantholactam, laurinlactam. Furthermore, in accordance with the invention, it is possible to use mixtures of such polymerizates or polycondensates, respectively. Suitable diamines, in accordance with the invention, which are combined with a dicarboxylic acid, are, e.g. 2,2,4- or 2,4,4-trimethylhexamethylenediamine, 1,3- or 1,4-bis(aminomethyl)cyclohexane, bis(p-aminocyclohexyl)methane, m- or p-xylylene diamine, 1,4-diaminobutane, 1,5-diamino-2-methylpentane, 1,6-diaminohexane, 1,8-diaminooctane, 1,9-diaminononane, 2-Methyl-1,8-diaminooctane, 1,10-diaminodecane, 1,12-diaminododecane, cyclohexyldimethylenediamine, and the dicarboxylic acids selected from the group of succinic acid, glutaric acid, adipic acid, suberic acid, pimelic acid, suberic acid, acelaic acid, sebacic acid, dodecanedicarboxylic acid, octadecanedicarboxylic acid, 4-cyclohexanedicarboxylic acid, terephthalic acid, isophthalic acid, and the naphthalene dicarboxylic acids.

Specific examples of the polyamides used in the context of the present invention and the additionally added (co) polyamides to the mixtures or alloys for the moulding compositions in accordance with the invention respectively, are therefore homo- and copolyamides from the group of PA 6, PA 66, PA 11, PA 46, PA 12, PA 1212, PA 1012, PA 610, PA 612, PA 69, PA 10T, PA 12T, PA 12I, mixtures thereof or copolymers based on monomers used. Preferred are, in accordance with the invention, also copolyamide PA 12T/12, PA 10T/12, PA 12T/106 and PA 10T/106. Furthermore are e.g. PA 6/66, PA 6/612, PA 6/66/610, PA 6/66/12, PA 6T/66, PA 6/6T, PA 6/6I, PA 6I/6T or mixtures thereof or mixtures such as PA 12/MACMI, PA 66/6I/6T, MXD 6/6 preferred polyamide moulding compositions as well.

In accordance with the invention the polyamide moulding compositions may also contain polyamide 12-blockcopolymers which contain polyester-, polyether-, polysiloxane-, polycarbonate-, polyacrylate-, polymethacrylate- or polyolefin segments as further components beside a proportion of at least 20% polyamide 12 components. Representatives of this class of polymers are polyether amides, polyetheresteramides and polyester amides.

In accordance with the invention the thermoplastic polyamide moulding compositions may further contain common, to the expert well-known additives solely or in combination, which are selected from the group, consisting of impact strength agents, other polymers, bonding agents, flame proofing agents, reinforcing agents such as glass- and C-fibers, UV- or heat stabilizer, stabilizers against weathering, minerals, processing aids, crystallization accelerators or inhibitors, oxidation inhibitor, flowability agents, lubricants, mould removers, flame proofing agents, pigments, dyes and marking agents and fillers such as carbon black or graphite or platelike nanoparticles, corresponding to all known additives for polyamides as they are necessary for any respective application.

For certain purposes to the previously described (co)polyamides or mixtures thereof may also be added other common polymers such as polyesters, polyolefins, polycarbonates, AN- and ABS polymerizates, functionalized copolyolefins and ionomers.

As further additives for the thermoplastic polyamide moulding compositions, in accordance with the invention, impact strength modifiers are used. For example, these are copolymers based on polyolefins of low glass transition temperature which may contain acrylic acid or which may be mould plugged with maleic acid anhydride. Particularly mentioned are impact strength modifiers such as ethylene-propylene-copolyolefins or ethylene-propylene-diene-caoutchoucs (EPDM) or acrylate caoutchoucs.

In preferred embodiments the moulding compositions further contain nanoscale fillers. In a particular embodiment of the invention the fillers are either silicon dioxide or silicon dioxide hydrates. In one embodiment in the polyamide mould certain nanoscale fillers are available as an evenly dispersed, layered material. Before introducing them into the matrix, they have a layer thickness of 0.7 to 1.2 nm and an interlayer distance of the mineral sheets of up to 5 nm.

Aprotic compounds containing a polar functional group and an apolar alkyl group may essentially facilitate the introduction of such fillers. When added to layered silicates, their polar group can function as a coordination site for the cation and thereby cause the interlayer distance to increase and therefore essentially improves and accelerates the separation of the primary particles and their distribution in the matrix.

Such minerals can be added at any step of the polymer manufacturing and be finely distributed on the nanometer scale. Preferred are minerals which already have a layered structure such as layered silicates, double hydroxides such as hydrotalcite or also graphite. Nanofillers based on silicones, silica or silsesquioxanes can be used as well.

In accordance with the invention 1:1 and 2:1 layered silicates are considered layered silicates. In these systems layers of $SiO_4$-tetrahedrons are connected with those of $M(O,OH)_6$-octahedrons in a regular way. M stands for metal ions such as Al, Mg, Fe. For the 1:1 layered silicates each tetrahedron layer is connected with one octahedron layer. Examples are kaolin- and serpentine minerals.

In one embodiment of the invention for the preparation of thermoplastic polyamide moulding compositions the aprotic compound is given to granulates of (co)polyamide with at least 20% part of polyamide 12 and they are mixed until the compound has diffused into the granulates. The mixing is preferably performed at higher temperatures, preferably at 50-160° C., more preferred at 60-120° C. For example, the aprotic compound can be applied as a liquid film to the granulates, after that, if need be, further powdered additives are added, and then the extrusion following common, well-known procedures can take place.

If the aprotic compound is used in higher amounts, for example to be used as a plasticizer for the polyamide, it can be applied into the melt continuously by a pump.

Furthermore, it is possible to add the aprotic compound immediately before polymerisation/polycondensation of the monomers, i.e. monomer mixture to the polyamide matrix or during the polymerisation/polycondensation to the polyamide reaction mixture. During the preparation of polyamide 12, for example, the aprotic compound can be added to 12-aminolauric acid or lactam 12, and the resulting mixture is then, if need be by adding at least one chain length regulator, polymerised. The resulting granulates can then be thermoplastically converted during injection moulding and extrusion processes.

If there is already an application related granulate based on (co)polyamide and during the processing of which problems due to solid deposits occur, then the aprotic compound can be easily applied in suitable amounts for application as a liquid film on the granulate surface, after which, if need be, thermal postprocessing can take place and thereby the aprotic compound diffuses into the granulate, which thereby regains its good flowability, or suitable solid additives can be subsequently applied.

In a preferred embodiment of the invention the aprotic compound is continuously incorporated during an extrusion run, preferably by use of a twin screw extruder, so-called ZSK, especially at the same time with further components of the formulation into the polyamide matrix of (co)polyamide with at least 20% polyamide 12. The aprotic compound can also be incorporated at higher concentrations, preferably in concentrations of about 3 to 30% by weight, and the such produced granulate can be used as a masterbatch.

The polyamide moulding compositions, in accordance with the invention, are used for thermoplastic conversion into items of practical use in discontinuous processes, especially in injection moulding, and continuous processes such as the extrusion of films, fibers, tubes and jacketings, though the thermoplastic polyamide moulding compositions in accordance with the present invention are especially outstanding, because during thermoplastic conversion no solid deposits are formed.

The following examples should explain the invention without imposing restrictions on it.

EXAMPLES

The following examples shall explain the invention without limiting it.

In the examples mean:

| Abbreviation | Indication |
|---|---|
| S | aprotic solvent liquid |
| NOP | n-octylpyrrolidon |
| TBH | tetrabutyl urea |
| NOC | n-octylcaprolactam |
| LC12 | Laurinlactam |
| ALS | amino carboxylic lauric acid |
| SS | sebacic acid |
| PA12 | polyamid 12 |
| Grilamid L20 nature | mediumviscous PA12, base granulate, injection moulding quality by EMS-Chemie AG, CH-Domat/Ems |
| Grilamid L20G nature | medium viscous PA12 with lubricant by EMS-Chemie AG, CH-Domat/Ems |
| Polyamid Typ A | standard traded mediumviscous PA12; hydrolysis-, heat-, UV-resistant, by EMS-Chemie AG, CH-Domat/Ems |
| MVR | Melt Volume Index |
| VB | Example for comparison |
| $\eta_{rel}$ | relative solution viscosity of the polylactam, measured as 0.5% solution in m-cresol in accordance with EN ISO |

Examples 1-3

Solubility of LC12 in the Solvent Liquid

In a heated glass tube 5 g LC12 together with NOP, TBH and NOC in different amounts of mass were melted at 180° C. under inert gas and mixed by shaking. The weight proportion of the solvent liquid was determined at which, after cooling down of the mixture to room temperature, the whole amount of LC12 remained in solution (table 1) In NOP and NOC 15% each and in TBH 8% by weight LC12 could be dissolved.

Examples 4-6

Diffusion of the Solvent Liquid into the PA12 Matrix

It was studied which amount of solvent liquid diffuses into PA12. For this in a conical flask 30 g of Grilamid L20 nature were weighed-in and heated to 120° C. Afterwards 2% by weight of each solvent liquid were added stepwise under continuous shaking. The diffusion into the granulate were observed by the flowability of the granulate grains. This process was repeated until no further solvent liquid was absorbed. In example 5 at maximum 4% by weight TBH were absorbed by the granulate, in examples 4 and 6 at maximum 10% by weight NOP or NOC respectively could be absorbed, but the maximum absorbance capacity had not been reached (table 2).

Examples 7-10

Sublimation Behaviour of LC12 from Hydrolytic PA12 While Using Solvent Liquids in Accordance with the Invention Hydrolytic PA12 was prepared in a heated glass tube by condensation of ALS under inert gas where the molar mass was set to 10000 g/mol by SS (table 3). Also, 0.15% by weight LC12 and 0.6% by weight each NOP, TBH and NOC were added in order to observe the sublimation behaviour of LC12 from the formulations in accordance with the invention. The educts were melted at 200° C. for 1 h and subsequently heated to 250° C. for 4 h. The formed water was removed from the glass tube by a continuous inert gas flow. After completion of the reaction it was heated for 1 h at 280° C., a sublime was out on the glass tube and the sublimate or condensate was observed. Without added S pure LC12 sublimed (example 7), with added S a mixture of LC12 and S, which remained liquid, condensed. In example 10 the amount of TBH was not sufficient to completely liquefy the LC 12 sublimate.

Examples 11-15

Film Production on a Chill Roll

On a twin screw-type extruding machine ZK 25 T by the company Collin, Ebersberg, Grilamid L20 nature was melted and pulled off as a film during which deposit formation of LC12 was observed. The diameter of both of the co-rotating screws was 25 mm and the length/diameter ratio L/D=8/1. The granulate was dosed by a gravimetric dosing machine K-Tron K-SFS-24 with feed screw and melted through five heating zones at 100, 230, 240, 240, and 240° C. The melt was withdrawn through a horizontal slit die (120 mm). The screw speed were 150 rpm with a throughput of 3 kg/h. The film was pulled off by a flat foil machine Collin Chill Roll Typ CR 72 T, flattened and coiled up. The first two cylinders were brought to the right temperature (20° C.) and closed. Afterwards the film went over a chill roll and was coiled up. Without added solvation liquid NOP solid deposits were formed on the upper tempered roll within a few minutes. From time to time the deposits got off the chill roll and sticked to the film. In subsequent tests each 0.1, 0.25 and 0.5% by weight NOP were added to the polymer (examples 12-14, table 4). The deposits decreased with higher NOP portions until a film could be extruded at 0.5% by weight NOP without any LC12 deposit. With TBH 0.7% by weight NOP were sufficient to completely prevent deposit formation (example 15b).

Example 16-19

Injection Mould of PA12 with Deposit Reducing Additives

On an injection moulding machine Krauss Maffei KM 50-55C studies on deposit formation by LC12 or additives respectively were conducted. A module for joint line tension bars was used as a tool, which had a nitrified exhauster inset with an vent depth of 0.01 mm. To determine the minimum content of deposit reducing additive on which no solid deposits from LC12 in the injection moulding tool are formed, each 0.061, 0.125, 0.250, and 0.500% by weight of the solvation liquids NOP, TBH or NOC respectively were added to the Grilamid L20G nature and with an injection speed of 100 mm/s and a sharp mass temperature of 290° C. formed into tension bars (table 5). With a too low content of S a deposit could be observed at the air vent slot of the tool, but with a sufficient content no deposit was formed, but a thin, medium to low viscous colourless liquid film which did not impair the injection moulding process in any way. From a content of at least 0.125, 0.500 or 0.250% by weight respectively with NOP, TBH or NOC respectively no solid LC12 deposits were formed. Without the use of the aprotic solvent in accordance with the invention, the formation of a solid deposit is observed in any case.

Examples 20-29

Influence of the Solvation Liquid on the Decomposition and the Mechanic Properties of PA12

In analogy to examples 11-15 on a twin screw-type extruding machine NOP, TBH and NOC at each 0.25, 0.50 and 1.00% by weight were incorporated into PA12 (Grilamid L20G nature) and processed to granulate. The granulate was compounded through five heating zones at 100, 230, 240, 240 und 240° C. and extruded through an angle head with a nozzle diameter of 3 mm, cooled in a water bath and granulated with a Collin CSG 171 T granules machine. The granulate was injection moulded on a Arburg Allrounder 320-210-750 at 258° C. mass temperature, 40° C. mould temperature, an injection pressure of 45 bar and a cycle time of 30 s into tension bars which were used to study the influence of S on decomposition reactions of the polymer and its mechanical properties (table 6). Up to a concentration of 1% none of the S lead to an increased decomposition in the melt. $\eta_{rel}$ and MVR after 4 and 20 min. respectively showed no difference as compared with the standard material Grilamid L20 G natur (example 29). Also the mechanical properties were not influenced, only the breaking elongation showed about 19-65% increased values. Thereby the breaking strength was increased.

Examples 30-31

Corrugated Tube Extrusion of PA12 with NOP

To study the effect of the solvation liquid on the production of corrugated tubes a compound with 0.5% NOP in polyamide 12 Typ A was prepared and during endurance test compared with the pure polyamide Type A (table 7). The material was extruded at 250° C. (Mütller & Sohn AG, Rorbas) and processed to corrugated tube (Uniwell Corrugator) with a pull off speed of approximately 2 m/min and a mould baking temperature of 50° C. The compound in accordance with the invention showed after 10 h only very few deposits at the evacuation slits, while with the pure PA12 without NOP after already 1 hour LC12 deposit was formed which blocked the evacuation slits after 3 hours. The values for $\eta_{rel}$ rel show no reduction in example 30, which indicates that no polymer degradation occurs in presence of the deposit reducing additive S.

TABLE 1

Solubility of LC12 in the solvation liquids in accordance with the invention

| Example | S | Solubility LC12 [% by weight] |
|---|---|---|
| 1 | NOP | 15 |
| 2 | TBH | 8 |
| 3 | NOC | 15 |

TABLE 2

Diffusion of the aprotic solvent into the PA12 matrix at 130° C.

| Example | S | Proportion S [% by weight] |
|---|---|---|
| 4 | NOP | >10 |
| 5 | TBH | 4 |
| 6 | NOC | >10 |

TABLE 3

Sublimation behaviour of LC12 from hydrolytic PA12.

| Example | ALS [g] | SS [g] | LC12 [g] | NOP [g] | NOC [g] | TBH [g] | Sublimate/ Condensate |
|---|---|---|---|---|---|---|---|
| VB 7 | 32.7 | 0.61 | 0.15 | — | — | — | solid |
| 8 | 32.7 | 0.61 | 0.15 | 0.6 | — | — | liquid |
| 9 | 32.7 | 0.61 | 0.15 | — | 0.6 | — | liquid |
| 10 | 32.7 | 0.61 | 0.15 | — | — | 0.6 | solid/liquid |

TABLE 4

Deposit formation during film extrusion with varied proportions of solvate liquid S in Grilamid L20.

| Example | Proportion S [% by weight] | S | LC12 deposit on the cylinder |
|---|---|---|---|
| VB 11 | — | — | very thick deposit |
| 12 | 0.10 | NOP | thick deposit |
| 13 | 0.25 | NOP | light deposit |
| 14 | 0.50 | NOP | thin, colourless NOP-film |
| 15a | 0.50 | TBH | light deposit |
| 15b | 0.70 | TBH | thin colourless film, no solid deposit |

TABLE 5

Composition of the deposits formed during injection moulding with varied proportions of solvate liquid S in Grilamid L20 G.

| Example | Proportion S [% by weight] | NOP | TBH | NOC |
|---|---|---|---|---|
| 16 | 0.061 | highly viscous | solid | solid |
| 17 | 0.125 | lowly viscous | solid | highly viscous |
| 18 | 0.250 | lowly viscous | highly viscous | lowly viscous |
| 19 | 0.500 | lowly viscous | lowly viscous | lowly viscous |

TABLE 6

Mechanical properties of Grilamid L20 G with varied proportions of solvate liquid S

| | | Example | | | | | | | | | |
|---|---|---|---|---|---|---|---|---|---|---|---|
| | | 20 | 21 | 22 | 23 | 24 | 25 | 26 | 27 | 28 | VB 29 |
| S | | NOP | NOP | NOP | TBH | TBH | TBH | NOC | NOC | NOC | — |
| Proportion S | % by weight | 0.25 | 0.50 | 1.00 | 0.25 | 0.50 | 1.00 | 0.25 | 0.50 | 1.00 | — |
| H$_2$O content | % by weight | 0.019 | 0.089 | 0.039 | 0.060 | 0.081 | 0.103 | 0.044 | 0.072 | 0.064 | 0.081 |
| MVR (275° C., 5 kg, 4 min) (ISO1133) (a) | cm$^3$/10 min. | 100 | 127 | 122 | 122 | 137 | 132 | 100 | 118 | 130 | 119 |
| MVR (275° C., 5 kg, 20 min) (ISO1133) (b) | cm$^3$/10 min, | 167 | 188 | 147 | 158 | 184 | 206 | 146 | 174 | 183 | 173 |
| $\eta_{rel}$ (base granulate) | — | 1.865 | 1.825 | 1.828 | 1.824 | 1.835 | 1.820 | 1.831 | 1.821 | 1.835 | 1.835 |
| $\eta_{rel}$ (fusion cone from MVR measurement a)) | — | 1.901 | 1.794 | 1.792 | 1.804 | 1.748 | 1.791 | 1.809 | 1.804 | 1.800 | 1.817 |
| $\eta_{rel}$ (fusion cone from MVR measurement b)) | — | 1.743 | 1.725 | 1.765 | 1.738 | 1.748 | 1.720 | 1.770 | 1.740 | 1.748 | 1.753 |
| Tension module | MPa | 1405 | 1400 | 1375 | 1295 | 1320 | 1325 | 1220 | 1250 | 1255 | 1400 |
| Tensilestress at yield | MPa | 45 | 45 | 44 | 43 | 43 | 43 | 41 | 42 | 42 | 45 |
| Yield strength | % | 5.0 | 4.8 | 5.0 | 5.3 | 5.2 | 5.1 | 5.8 | 5.7 | 5.4 | 5.1 |
| Breaking strength | MPa | 57 | 47 | 47 | 56 | 47 | 60 | 60 | 61 | 32 | 38 |
| Breaking elongation | % | 315 | 260 | 255 | 316 | 260 | 335 | 330 | 355 | 140 | 215 |
| Impact Charpy new (23° C.) (ISO179/1eU) | kJ/m$^2$ | >100 | >100 | >100 | >100 | >100 | >100 | >100 | >100 | >100 | >100 |
| Impact Charpy new (−30° C.) (ISO179/1eU) | kJ/m$^2$ | >100 | >100 | >100 | >100 | >100 | >100 | >100 | >100 | >100 | >100 |
| Charpy impact strength new (23° C.) (ISO179/1eA) | kJ/m$^2$ | 6.1 | 6.1 | 5.9 | 5.9 | 5.9 | 5.9 | 5.9 | 5.9 | 6.2 | 6.0 |
| Charpy impact strength new (−30° C.) (ISO179/1eA) | kJ/m$^2$ | 6.2 | 6.0 | 5.8 | 6.5 | 6.0 | 6.1 | 6.3 | 5.9 | 6.4 | 6.2 |

TABLE 7

Decomposition and processing behaviour (corrugated tubes formation) of PA 12 with NOP as additive for deposit reduction

| | | Example | |
|---|---|---|---|
| | | 30 | VB 31 |
| Base material | | Polyamide Type A | Polyamide Type A |
| S | | NOP | — |
| Proportion S | % by weight | 0.50 | — |
| H$_2$O content | % by weight | 0.038 | 0.072 |
| LC12 content | % by weight | 0.21 | 0.21 |
| MVR (275° C., 5 kg, 4 min) | cm$^3$/10 min. | 21.0 | 10.5 |
| MVR (275° C., 5 kg, 20 min) | cm$^3$/10 min. | 23.0 | 12.3 |
| $\eta_{rel}$ (base granulate) | — | 2.31 | 2.35 |
| $\eta_{rel}$ (fusion cone 4') | — | 2.31 | 2.48 |
| $\eta_{rel}$ (fusion cone 20') | — | 2.29 | 2.52 |
| Permanent test corrugation tube formation | | | |
| Deposits | | after 10 h only minor deposits | after 1 h already significant deposits |
| Blocking of vacuum slits | | >> 10 h | |

Example 32 and Example for Comparison 33

Flat Film Extrusion of Polyamide 12 with Deposit Reducing Additives

Regarding the problems of solid depositions during extrusion a polyamide 12 Type A with (Example 32) and without (Example 33) addition of NOP was studied in flat foil extrusion. The compound in accordance with the invention contained 0.5% by weight NOP (N-octyl-pyrrolidone).

In a further type of experiment the two polyamides have been treated by a heating storage (110° C./48 h) prior to the extrusion. The foil quality of both of the foils were tested. Additionally the behaviour of polyamide 12 with and without added NOP during longer moulding time in the extruding machine was investigated.

The flat foil extrusion was performed on a laboratory machine (Twin-screw type extruder ZK 25T with foil tool and delivering rollers of the spreader, Chill Roll Typ CR 72 T by Company Collin, Ebersberg) using the following parameters:

| | |
|---|---|
| Sets for heating zones | 100° C., 230° C., 240° C., 240° C., 250° C. |
| Melting point | 253° C. |
| Revolution | 150 R/Min* |
| Dose | 3 kg/h** |
| Chill roll temperature | 20° C. |

*R/Min = rounds per minute
**h = hour

Figure 1:
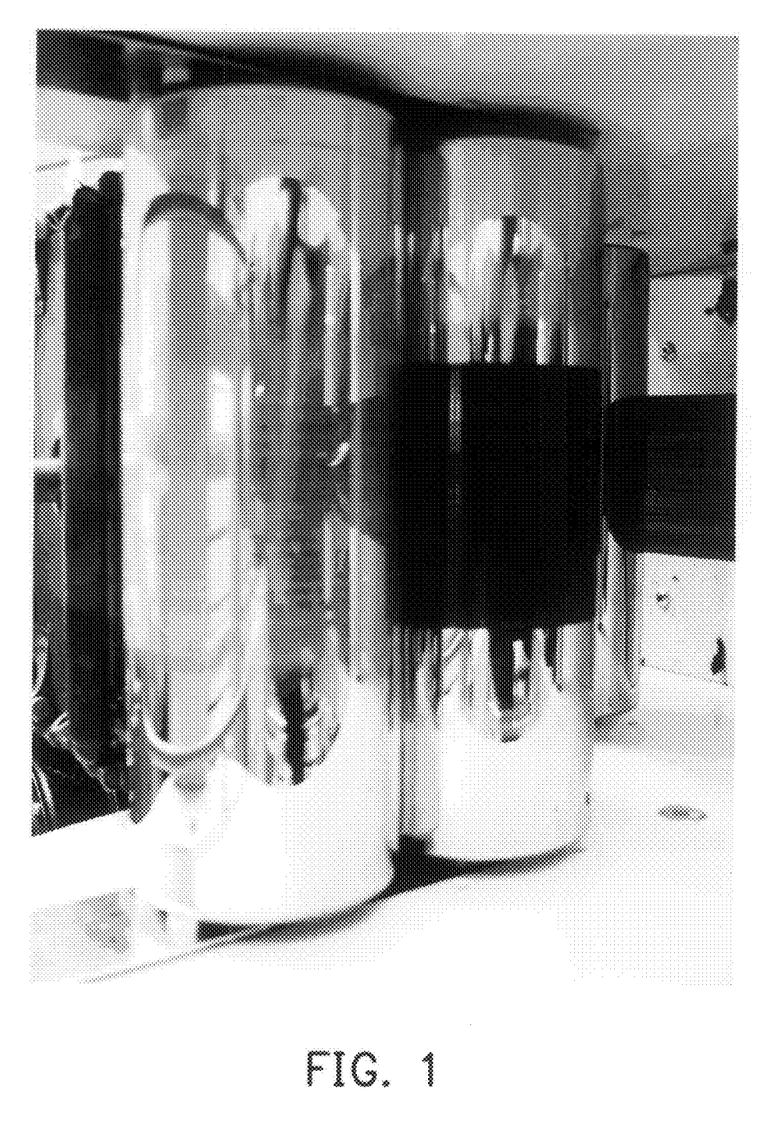
FIG. 1 shows that non modified polyamide 12 type A produced a thick, white deposit on the cylinder shortly after start of the extrusion (1 minute) (prior art) (see example 33).
Figure 2:
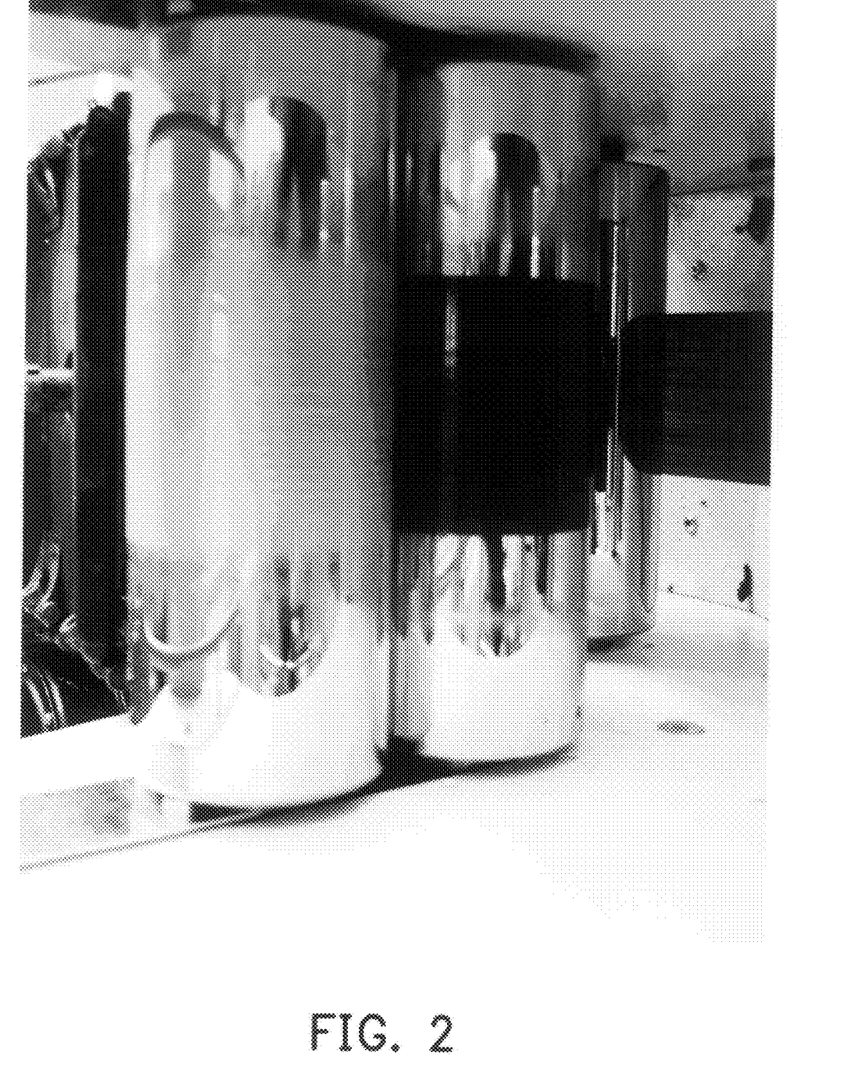
FIG. 2 shows the formation of solid deposits after five minutes (prior art) (see example 33).
Figure 3:
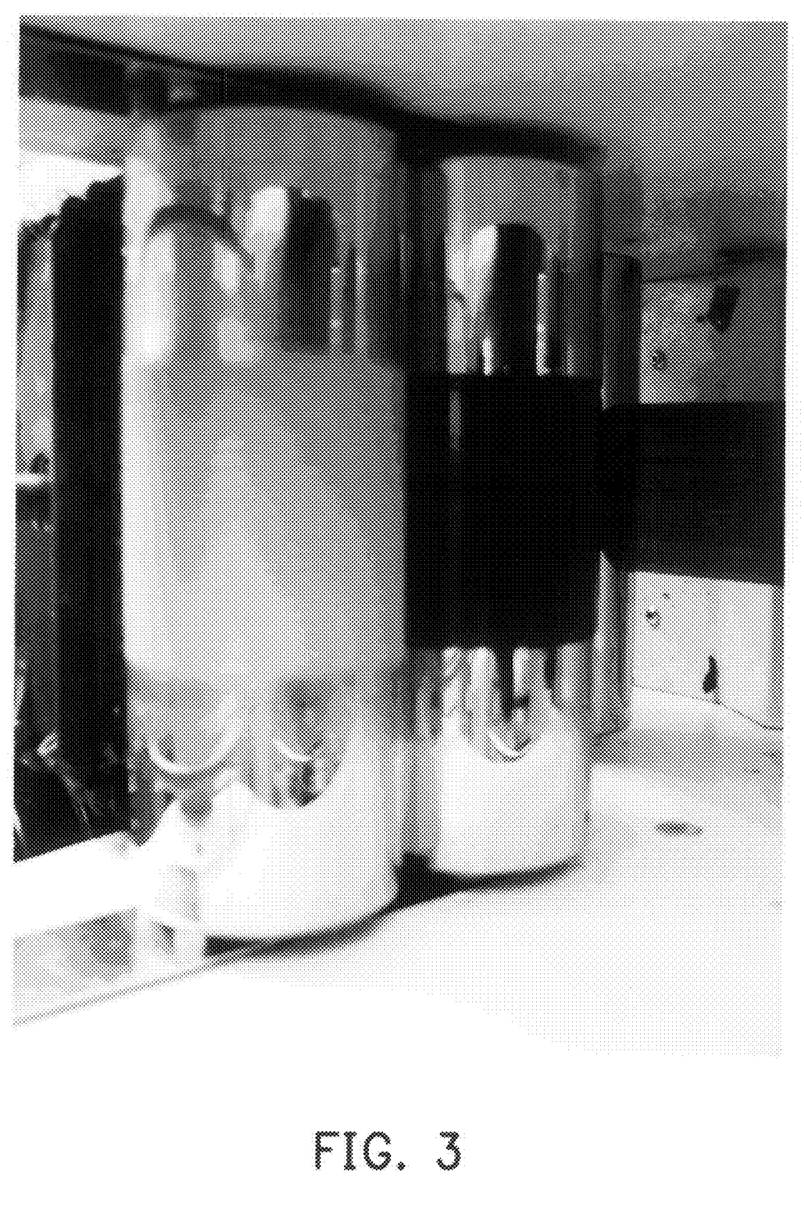
FIG. 3 shows the formation of solid deposits after ten minutes (prior art) (see example 33).
Figure 4:
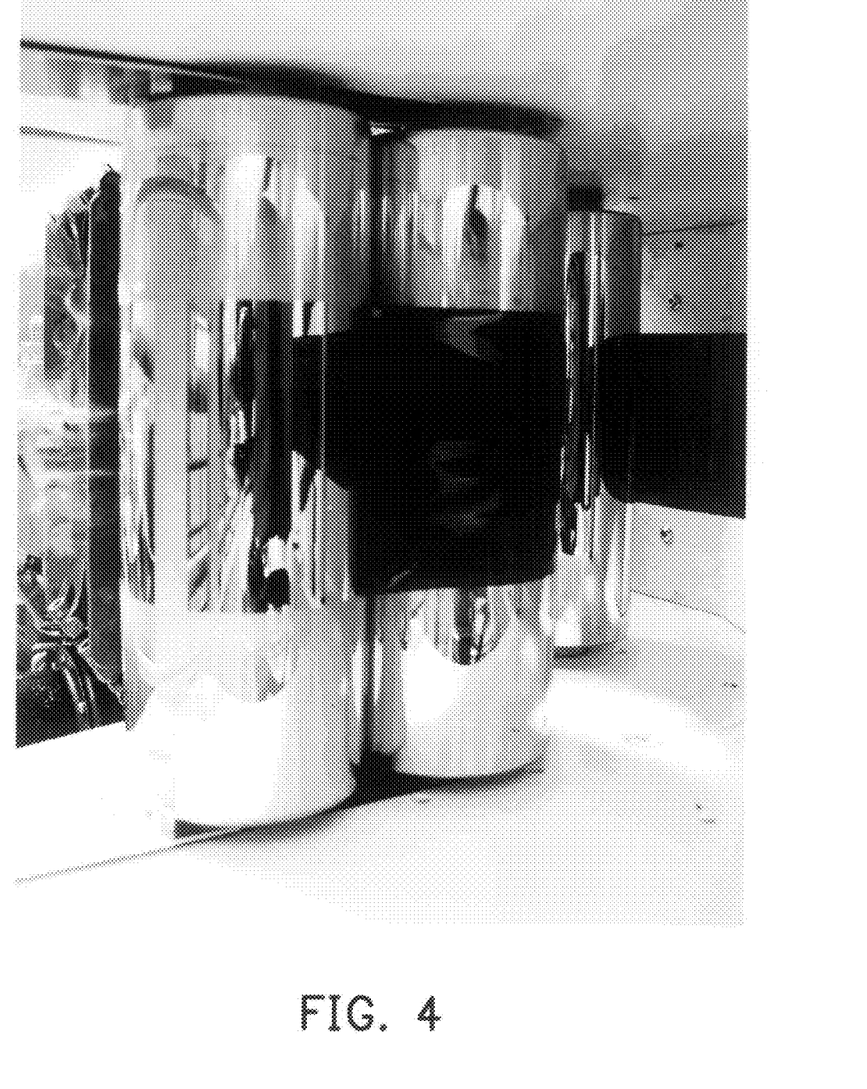
FIG. 4 shows the processing of NOP containing polyamide 12 according to the present invention with the addition of 0.5% by weight of NOP after 1 minute (see example 32).
Figure 5:
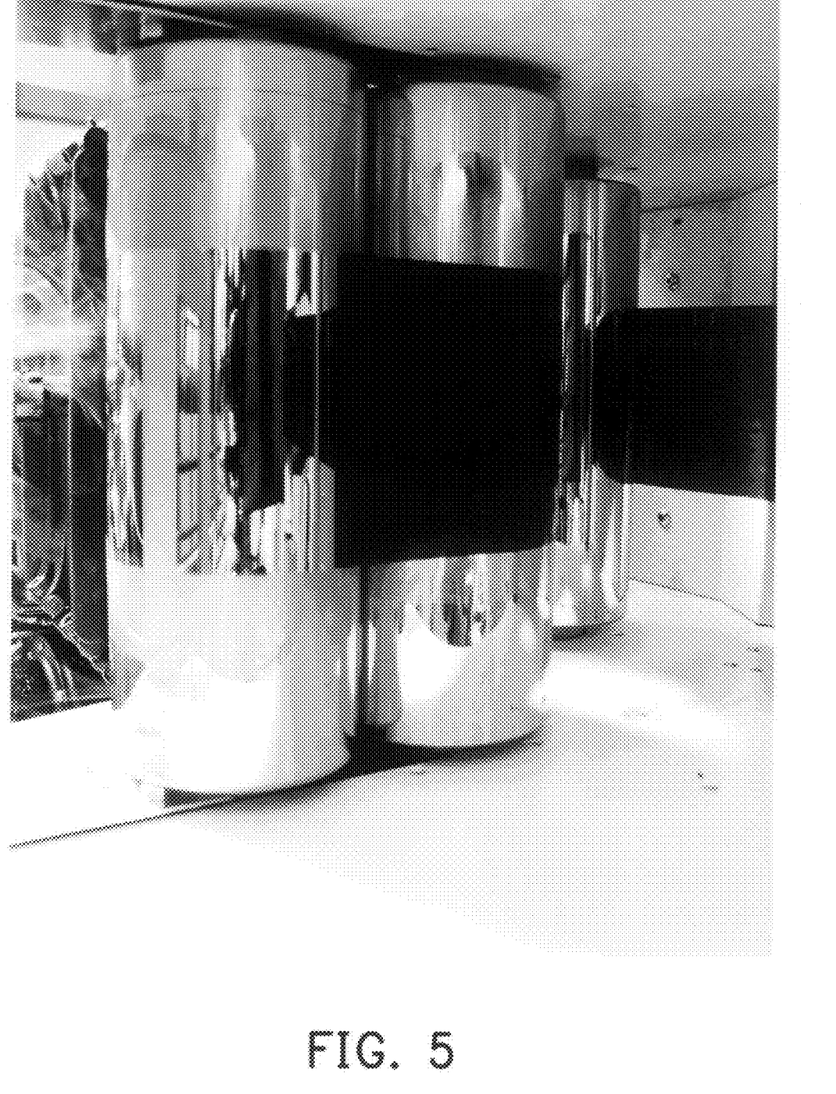
FIG. 5 shows the use of 0.5% by weight of NOP after 5 minutes according to the present invention (see example 32).
Figure 6:
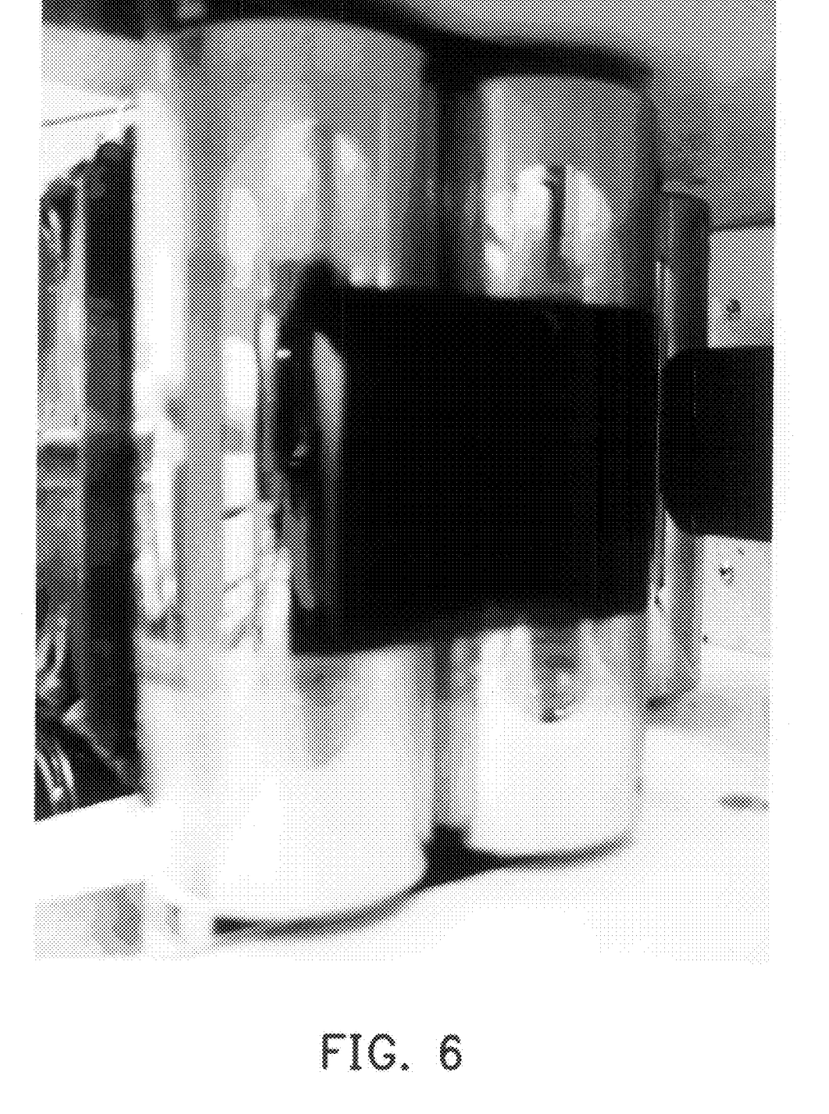
FIG. 6 shows the use of 0.5% by weight of NOP after 10 minutes according to the present invention (see example 32).

Results:
 During processing of the NOP containing polyamide 12 no formation of solid deposit on the tempered cylinder (20° C.) was observed, even after longer time of extrusion. Therefore no solid deposit are formed in accordance with the invention (see FIGS. 4, 5, 6).
 The non-modified polyamide 12 Type A produced a thick, white deposit on the cylinder shortly after start of the extrusion which increased by time of the proceeding experiment. (see FIGS. 1 to 3). The main component of this solid deposit is lactam 12.
 The same behaviour was also found after 48 h storage of the granulate at 110° C., i.e. the compound containing NOP showed no deposits while the non-modified polyamide 12 Typ A produced significant deposit after even short time of extrusion.
 A further positive result of the addition of NOP is that during long exposure to heat neither significant building up nor decomposition of the polyamide 12 can be observed. Leaving the melt for 5 to 10 minutes in the foil extruder (no throughput), the non-modified polyamide 12 builds up without control and the film shows a large number of pinholes after restart. However, this formation of pinholes can be prevented. The NOP containing polyamide 12 did not show any pinholes in the extruded film after 5 to 10 minutes residence time (hold-up).

The invention claimed is:
1. A thermoplastic polyamide moulding composition containing at least 20% by weight of polyamide 12, related to a total mass of polyamide matrix component, and/or one copolymer with at least 20% by weight polyamide 12 components, related to the total mass of the polyamide matrix component and at least one aprotic compound in amounts of 0.05 to 15.0% by weight related to the total mass of the polyamide matrix component, wherein the thermoplastic polyamide moulding composition is made by hydrolytic polymerization or hydrolytic polycondensation processes, and the at least one aprotic compound is selected from the group consisting of N-alkylated, cyclic carboxylic acid amides with 5 to 7 ring elements, wherein the carboxylic acid amide corresponds to formula I, wherein x is 1 to 3 and R1 an octyl residue, wherein the octyl residue is linear or branched at the nitrogen.

2. The thermoplastic polyamide moulding composition according to claim 1, characterized in that the at least one aprotic compound is selected from the group consisting of N-octylpyrrolidone and N-octylcaprolactam.

3. The thermoplastic polyamide moulding composition according to claim 1, characterized in that the polyamide 12 is a hydrolytically fabricable polyamide 12.

4. The thermoplastic polyamide moulding composition according to claim 1, characterized in that the copolymer is a polyamide 12-blockcopolymer which comprises polyester-, polyether-, polysiloxane-, polycarbonate-, polyacrylate-, polymethacrylate- or polyolefin segments as further components beside a proportion of the at least 20% polyamide 12 components.

5. The thermoplastic polyaxnide moulding composition according to claim 1, characterized in that the moulding composition is a two-phase polyamide blend comprising polyamide 12 and a semiaromatic polyamide.

6. The thermoplastic polyamide moulding composition according to claim 1, characterized in that the moulding composition is a polyamide blend with additionally at least one polyamide which is selected from the group consisting of PA 6, PA 66, PA 11, PA 46, PA 1212, PA 1012, PA 610, PA 612, PA 69, PA 10T, PA 12T, PA 12I and copolyamides based on monomers used in above polyamides and copolyamides based on polyaxnide 12, PA 6T/66, PA 6/6T, PA 6/6I, PA 6I/6T and mixtures thereof and a PA 12/MACMI mixture, a PA 66/61/6T mixture, a MXD 6/6 mixture, wherein also dimerised fatty acids with 36 and 44 C-atoms can be used as monomers.

7. The thermoplastic polyamide moulding composition according to claim 6, characterized in that the polyamide blend is a single or multi phase blend.

8. The thermoplastic polyamide moulding composition according to claim 7 characterized in that the moulding composition is a polyamide blend of the polyanilde 12 and an amorphous copolyamide or a semiaromatic polyamide.

9. The thermoplastic polyamide moulding composition according to claim 1, characterized in that the composition further comprises common additives solely or in combination, which are selected from the group consisting of impact strength agents, other polymers, bonding agents, flame proofing agents, reinforcing agents, stabilizers against decomposition by light, stabilizers against decomposition by heat, stabilizers against decomposition by weathering, minerals, processing aids, dyes and carbon black.

10. The thermoplastic polyamide moulding composition according to claim 1 characterized in that the composition further comprises plasticizers, selected from the group consisting of benzenesulfonic acid and toluenesulfonic acid, in amounts of 0.5 to 15% per weight corresponding to the total mass of the polyamide matrix component.

11. The thermoplastic polyamide moulding composition according to claim 1 characterized in that the compositions contain nanoscale fillers.

12. A method for producing the thermoplastic polyamide moulding composition according to claim 1, characterized in that the aprotic compound is applied to a granulate of the polyamide 12 and/or the one copolymer and is mixed until the compound is diffused into the granulate.

13. The method according to claim 12 characterized in that the method is used in a temperature ranging from a room temperature up to 160° C.

14. The method according to claim 13, characterized in that the method is used in a temperature ranging from 60 to 120° C.

15. A method for producing the thermoplastic polyamide moulding composition according to claim 1, characterized in that the aprotic compound is incorporated into the polyainide matrix of about 3 to 30% by weight, thereby forming granulate, and that such granulate is subsequently used as masterbatch.

16. A method for producing thermoplastic polyamide moulding composition according to claim 1, characterized in that, the aprotic compound is continuously incorporated into the polyamide matrix component during an extrusion run, simultaneously with the addition of at least one further component selected from the group consisting of impact strength agents, other polymers, bonding agents, flame proofing agents, reinforcing agents, stabilizers against decomposition by light, stabilizers against decomposition by heat, stabilizers against decomposition by weathering, minerals, processing aid, dyes and carbon black.

17. A method of thermoplastic conversion of the polyamide moulding composition according to claim 1 into commodity goods in discontinuous processes, and in continuous processes, characterized in that during the thermoplastic conversion no solid deposits are formed.

18. The thermoplastic polyamide moulding composition according to claim 1 characterized in that the composition further comprises plasticizers including N, N-dibutylbenzenesulfonamide or N,N-dibutytoluenesulfonamide.

* * * * *